US012736123B2

(12) United States Patent
Helfer et al.

(10) Patent No.: US 12,736,123 B2
(45) Date of Patent: Sep. 15, 2026

(54) DRIVE SYSTEM AND DRIVE TRANSMISSION

(71) Applicant: Schaeffler Technologies AG & Co. KG, Herzogenaurach (DE)

(72) Inventors: Marc Helfer, Ottrott (FR); Felix Vogel, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 182 days.

(21) Appl. No.: 18/717,707

(22) PCT Filed: Nov. 7, 2022

(86) PCT No.: PCT/DE2022/100817
§ 371 (c)(1),
(2) Date: Jun. 7, 2024

(87) PCT Pub. No.: WO2023/104230
PCT Pub. Date: Jun. 15, 2023

(65) Prior Publication Data

US 2025/0043860 A1 Feb. 6, 2025

(30) Foreign Application Priority Data

Dec. 7, 2021 (DE) ........................ 102021132153.0

(51) Int. Cl.
*F16H 57/04* (2010.01)

(52) U.S. Cl.
CPC ..... *F16H 57/0423* (2013.01); *F16H 57/0409* (2013.01); *F16H 57/0453* (2013.01);
(Continued)

(58) Field of Classification Search
CPC ............. F16H 57/0423; F16H 57/0409; F16H 57/0453; F16H 57/0457; F16H 57/0471; F16H 57/0483
See application file for complete search history.

(56) References Cited

U.S. PATENT DOCUMENTS

| | | | |
|---|---|---|---|
| 3,529,698 | A | 9/1970 | Nelson |
| 4,630,711 | A | 12/1986 | Levrai et al. |
| 2013/0145879 | A1 | 6/2013 | Nakamura et al. |

FOREIGN PATENT DOCUMENTS

| | | | |
|---|---|---|---|
| DE | 102015214339 A1 | 2/2017 | |
| DE | 102019102078 B | 6/2020 | |

(Continued)

OTHER PUBLICATIONS

European Patent Office, International Search Report received in International Application No. PCT/DE2022/100817, Jan. 17, 2023, 25 pages (including translation).

*Primary Examiner* — Huan Le
(74) *Attorney, Agent, or Firm* — Suiter Swantz IP

(57) ABSTRACT

A drive transmission includes a drive system. The drive system includes a drive unit having a drive housing. The drive system also includes a flow guide element which is mechanically fixed to the outside of the drive housing and which has at least a first cavity boundary for forming at least regions of a first fluid reservoir. A first cavity is delimited at least in regions by the first cavity boundary and is or can be fluidically connected to a lubrication device. The drive system and the drive transmission provide a means which can be used to lubricate connected or integrated transmission components in a straightforward, cost-effective, and space-saving manner.

20 Claims, 7 Drawing Sheets

(52) U.S. Cl.
CPC ..... *F16H 57/0457* (2013.01); *F16H 57/0471* (2013.01); *F16H 57/0483* (2013.01)

(56) References Cited

FOREIGN PATENT DOCUMENTS

| | | | |
|---|---|---|---|
| DE | 102019201586 | A1 | 8/2020 |
| DE | 102020202244 | A1 | 8/2020 |
| DE | 102020204588 | A1 | 11/2020 |
| EP | 3026300 | A1 | 6/2016 |
| EP | 3534042 | A1 | 9/2019 |
| JP | 2013108595 | A | 6/2013 |
| JP | 2020133880 | A | 8/2020 |
| WO | 2020157004 | A1 | 8/2020 |

71
60
82
73
73
85
60

41
42
40
45

100
70,71
72
80,82
10
1

DRIVE SYSTEM AND DRIVE TRANSMISSION

CROSS-REFERENCE TO RELATED APPLICATION

The present application is the U.S. National Phase of PCT Patent Application Number PCT/DE2022/100817, filed on Nov. 7, 2022, which claims priority to German Patent Application Number 10 2021 132 153.0, filed Dec. 7, 2021, the entire disclosures of which are incorporated by reference herein.

TECHNICAL FIELD

The disclosure relates to a drive system comprising a drive unit having a drive housing. The disclosure also relates to a drive transmission which comprises the drive system.

BACKGROUND

Various drive units integrated in drive assemblies or serial powertrains are known from the prior art.

Integrating a drive unit with a plurality of rotary electric machines in a drive assembly intended for a hybrid motor vehicle is subject to stringent installation space requirements, in particular in the axial direction.

An axially particularly short drive assembly is advantageous, in particular when such a drive unit is used in front-transverse arrangements in motor vehicles, in which the rotary electric machines and the internal combustion engine are used as front drives and a respective axis of rotation of n rotary electric machine and the internal combustion engine is arranged transversely of the longitudinal direction of the motor vehicle.

Among other things, hybrid transmissions with two electric machines are known, which enable switching between serial operation and parallel operation. In serial operation, an internal combustion engine drives a first electric machine that functions as a generator. The electrical energy generated is used to drive the second electric machine, the torque of which is transmitted to the wheels of a motor vehicle equipped with the hybrid transmission.

In parallel operation, the torque of a connected internal combustion engine is transmitted to the wheels of a motor vehicle equipped with the hybrid transmission, wherein the second electric machine runs idle, assists drive operation or regenerates.

In transmissions of motor vehicles, and also in transmissions that combine an electric motor drive function with an internal combustion engine drive, or hybrid transmissions, rotating elements that rub against one another are lubricated and cooled with a lubricant, such as oil. In most cases, there is an oil sump in the lowest region of the transmission in question for this purpose. Lubricant can be transported from this sump by being entrained by gears onto meshing gearsets and/or onto other gears or also bearing points. Alternatively or additionally, a pump can also be arranged in fluidic communication with the oil sump in order to transport the lubricant to points to be lubricated. The design of the volume of the oil sump and/or the power of the pump has/have a major impact on the lubrication that can be achieved. This in turn has a significant impact on the efficiency of the transmission and the drag torque caused by the transmission. The drag torque depends, among other things, on how deep a respective gear is immersed in the oil sump, what the spacing is between rotating gears and the transmission housing, how great the acceleration of the lubricant moved by the pump is and whether there are pressure losses when the lubricant is transported.

An oil interception mechanism is known from EP 3 534 042 A1, which provides lubrication within the transmission chamber. A gear of a differential transmission, or differential gear, is immersed in oil in a separate chamber of the oil sump in order to ensure that only the amount of oil that is actually required is accelerated by the differential gear. This reduces drag losses in the transmission.

SUMMARY

Against this background, the object of the present disclosure is to provide a drive system and a drive transmission comprising the drive system, with which lubrication of connected or integrated transmission elements is made possible in a simple, cost-effective and space-saving manner.

This object is achieved by a drive system according to claim 1 and by the drive transmission according to claim 7. Advantageous developments of the drive system are specified in sub-claims 2 to 6. Advantageous developments of the drive transmission are specified in sub-claims 8 to 10.

The features of the claims can be combined in any technically meaningful way, it also being possible to make reference for this purpose to the explanations from the following description and features from the figures which include supplementary developments of the disclosure.

The disclosure relates to a drive system for a motor vehicle comprising a drive unit with a drive housing and a flow guide element which is mechanically fixed to the outside of the drive housing and which has at least one first cavity boundary for forming at least regions of a first fluid reservoir. It is provided that a first cavity, which is delimited at least in places by the first cavity boundary, is fluidically connectable or connected.

The drive unit can in particular have at least one electric machine, which can optionally also be operated as a generator.

The flow guide element can be connected directly to the drive housing, or also indirectly, optionally also via a transmission housing that is mechanically coupled to the drive housing.

For the purposes of the present disclosure, a fluid is a liquid lubricant which can also have a cooling function, such as oil.

The cavity boundary is designed to delimit a cavity and to receive a fluid therein, which forms a reservoir.

Accordingly, according to the disclosure, lubrication of a unit to be lubricated can be provided outside the drive unit, but carried by the drive unit.

Furthermore, the flow guide element can have at least one second cavity boundary for forming at least regions of a second fluid reservoir, wherein a second cavity, which is delimited at least in regions by the second cavity boundary, is or can be fluidically connected to the lubrication device. The flow guide element can be designed to be open on one side if it is sealed on the open side by a subsequent transmission housing. This has the advantage that the flow guide element only requires very little axial space.

In particular for reasons of weight reduction and/or reducing manufacturing costs, the flow guide element can be made of plastic. This makes it possible to compensate for tolerances by slight deformation of the flow guide element and, accordingly, to easily adapt the flow guide element to the given geometric conditions.

An advantageous embodiment provides that the flow guide element forms a flow channel at least in regions for supplying fluid into at least one of the cavities.

A flow bifurcation can be formed in the flow channel for supplying fluid to the first cavity and to the second cavity.

By way of a rib, which can be formed by the flow guide element or also by a transmission housing resting on the flow guide element, fluid can be guided along this rib, wherein the flow bifurcation is arranged in the form of an opening next to the rib in such a way that the fluid flowing at a flow velocity below a limit velocity flows with a first partial quantity through the opening into the first cavity and with a second partial quantity further along the rib into the second cavity.

Furthermore, the flow guide element can have a baffle element to provide a baffle effect for a fluid impinging on the baffle element at above a limit velocity, in order to distribute the fluid through the flow bifurcation into the first cavity and into the second cavity.

The second cavity can have an overflow device by way of which fluid can flow into the first cavity when a limit level in the second cavity is exceeded. In particular, it is provided that the first cavity is at a lower height than the second cavity, such that fluid can pass from the second cavity into the first cavity under the effect of gravity.

The configuration according to the disclosure of the drive system ensures that, even at high lateral accelerations, an oil reservoir is available to each bearing point of a shaft from which lubrication of the respective bearing point can be achieved.

An advantageous embodiment provides that the flow guide element has a flow inlet which is located above both cavities when the flow guide element is aligned in an intended use position. In this way, the fluid can pass from the flow inlet into a respective cavity under the effect of gravity.

The intended use position refers to the position of the flow guide element after mounting in a motor vehicle, such that the flow guide element is located between the drive system and the transmission housing, which are arranged substantially horizontally next to one another.

A further aspect of the present disclosure is a drive transmission comprising a drive system according to the disclosure, wherein the drive transmission further comprises a transmission with a transmission housing and at least one cavity, which is delimited at least in regions by a cavity boundary, is delimited axially on one side by the outside of the transmission housing.

In particular, it is provided that the transmission housing is located axially next to the drive housing.

The present disclosure is not necessarily limited to the fact that a cavity delimited at least in places by a cavity boundary is delimited axially on one side by the outside of the transmission housing, but rather that the drive transmission can also be designed in such a way that a cavity delimited at least in places by a cavity boundary is delimited axially on both sides and optionally completely delimited by the flow guide element.

The lubrication device can be formed in or on a bearing of a differential gear shaft and/or a bearing of an intermediate gear shaft of the transmission connected to the drive unit. For this purpose, a respective channel can be formed in the transmission housing, which channel is fluidically connected to at least one of the cavities.

Alternatively or additionally to lubricating bearing points, the fluid from at least one of the cavities can also be used to lubricate meshing gears.

One embodiment provides that the drive transmission comprises a differential transmission with a differential gear, wherein the differential gear has the function of a paddle wheel pump and is arranged and designed in such a way that a volumetric flow of fluid delivered by way of the differential gear can be supplied to the flow guide element.

The differential gear is one of the gears of the differential transmission; in particular a gear whose axis of rotation runs parallel to an output shaft of the drive system. An advantageous embodiment provides that the gear is covered in regions by a cover element on its circumference and on the outside of the drive transmission, such that there is a gap between the radially outer side of the gear and the cover element, wherein the width of the gap is so small that a delivery effect on the fluid along the direction of rotation of the differential gear is achievable with the differential gear.

On the one hand, the cover element seals the drive transmission from the outside such that no fluid can escape.

In addition, the cover element forms part of a housing in which the differential gear runs in order to achieve the delivery of fluid using the paddle wheel pump principle. Accordingly, it is provided that the cover element has only a minimal radial distance from the outer teeth of the differential gear in order to achieve the delivery effect.

Furthermore, the drive transmission can be set up in such a way that the transmission housing receives a fluid volume in the lower region, in which the differential gear is immersed and from which the differential gear entrains fluid during its rotational movement. The compartment of the transmission housing delimiting this fluid volume can be divided into a first sub-compartment and a second sub-compartment. The two sub-compartments are separated from each other by a partition wall, which makes it possible to set a lower fluid level or a lower fluid fill level in the first sub-compartment into which the differential gear extends than in the adjacent second sub-compartment.

This in turn has the advantage that it is impossible for the differential gear to pump an unnecessarily large volume of fluid. This results in lower splashing losses, reduced drag torque and correspondingly increased efficiency.

The second sub-compartment is fluidically connected to a pump, which is designed to deliver fluid into the second sub-compartment. Due to a fluidic connection between the second sub-compartment and the first sub-compartment, fluid can flow from the second sub-compartment into the first sub-compartment.

The volumetric flow which can flow through the control connection between the second sub-compartment and the first sub-compartment is or can be set in such a way that it is ensured that the differential gear constantly entrains fluid as it rotates and supplies it to the flow guide element and thus also to the bearing points. Furthermore, the drive system can have a flow divider for dividing the fluid volume entrained by the differential gear in its rotational movement into at least two fluid streams, substantially at an angle to the delivery direction of the fluid by way of the differential gear. The angle can be between 30° and 90° in relation to the delivery direction, which is characterized by an ideal direction running tangentially to the circumference of the differential gear. This accordingly ensures that the divided partial volumetric flows are directed away axially on both sides of the differential gear.

If the differential gear is a helical gear, an advantageous embodiment provides that the flow divider has a separating element which is arranged axially offset with respect to the axial center of the gear in order to divide the fluid volume entrained by the differential gear in its rotational movement in the axial center thereof.

This ensures that the fluid entrained by the differential gear in its rotational movement is divided into a fluid volume which is supplied to the top of the flow guide element, and a fluid volume which is supplied to a bearing point of an intermediate shaft of the transmission and/or at least one gearset to be lubricated in the drive system.

The transmission housing can have a raised structure on its outside, wherein the flow guide element is complementary to the shape and size of the structure in a contact region on the outside of the transmission housing. In an advantageous embodiment, the flow guide element is fastened to the transmission housing using fastening elements such as fastening bolts.

The structure can have ribs, for example. Such a structural element or such a rib can also delimit at least one of the cavities in a liquid-tight manner. The flow guide element can also be sealed on such a structural element or on such a rib.

This means that such a structural element or such a rib can rest on the flow guide element and can serve to fix the flow guide element on the transmission housing and/or to provide a seal between the flow guide element and the transmission housing.

This embodiment thus combines a high mechanical load capacity of the transmission housing due to its design with at least one structural element, with the liquid-tight arrangement of the flow guide element on the transmission housing.

Furthermore, the disclosure comprises a drive arrangement with a drive transmission according to the disclosure, which has at least one drive element for driving a motor vehicle, which is or can be mechanically coupled to the differential gear.

The drive arrangement can also comprise an internal combustion engine, which is or can be coupled by way of an output element to an input of the drive system, and thus optionally to a rotor of an rotary electric machine of the transmission system.

The respective mechanical coupling can be implemented by way of a clutch or by way of a rigid, rotationally fixed connection.

BRIEF DESCRIPTION OF THE DRAWINGS

The disclosure described above is explained in detail below against the relevant technical background with reference to the associated drawings, which show preferred developments. The disclosure is in no way limited by the purely schematic drawings and it should be noted that the exemplary embodiments shown in the drawings are not limited to the dimensions shown. In the figures.

DETAILED DESCRIPTION

The structure of the flow guide element 40 is firstly explained with reference to FIGS. 1-4.

In the embodiment shown here, the flow guide element 40 takes the form of a plastic part. It comprises a flow inlet 41 in the upper region in order to be able to receive a fluid 30, as indicated in FIG. 2.

Figures 1, 2:
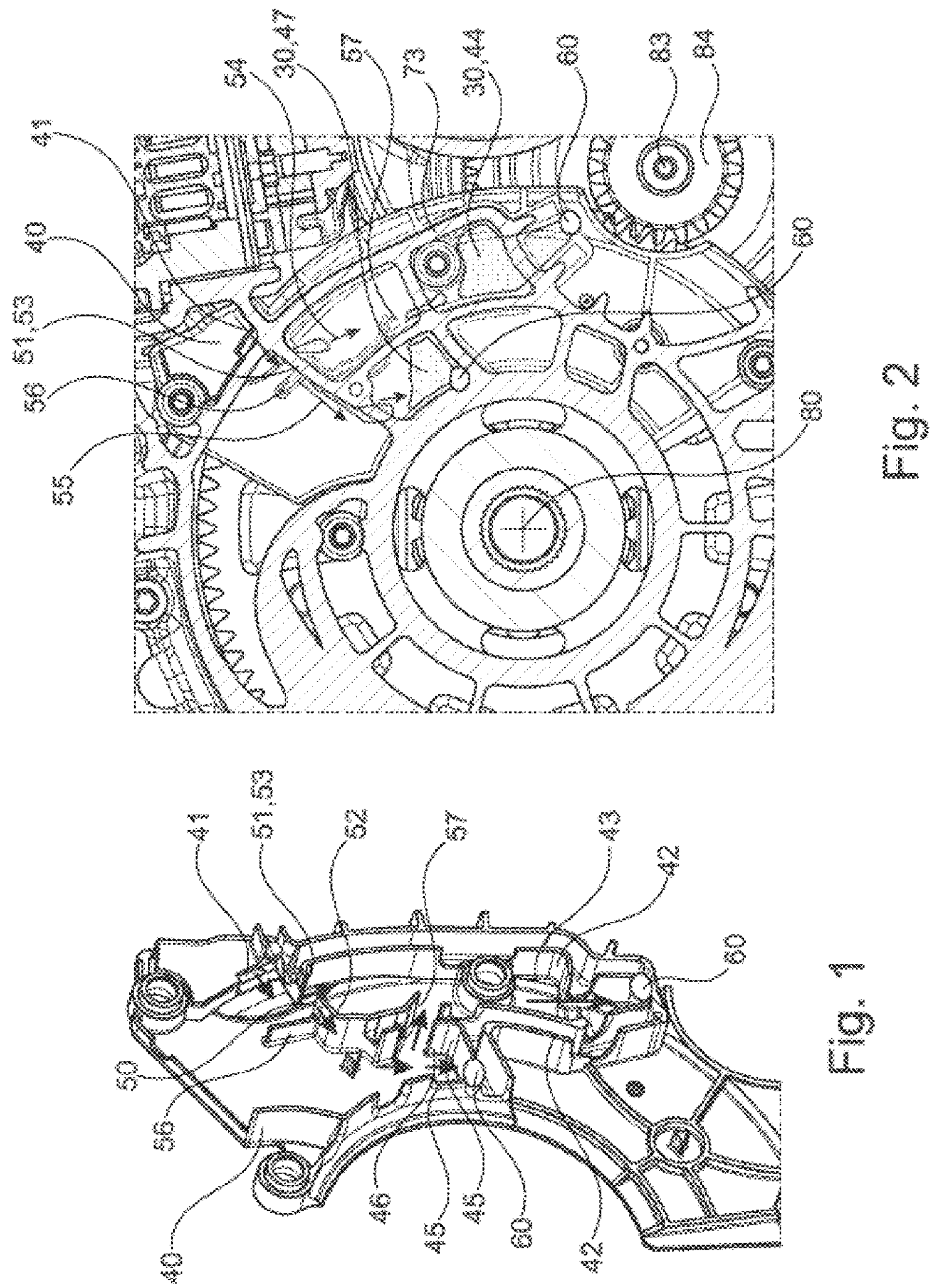
FIG. 1: shows a perspective view of a flow guide element.
FIG. 2: shows a front view of the flow guide element.

The flow guide element 40 forms a first cavity boundary 42 to provide a first cavity 43 for the purpose of receiving a first fluid reservoir 44, which can be seen in FIG. 2.

FIG. 2 shows a view of the flow guide element 40 in a section through an adjacent transmission housing.

Furthermore, the flow guide element 40 forms a second cavity boundary 45 to provide a second cavity 46 for the purpose of receiving a second fluid reservoir 47, as also shown in FIG. 2.

To supply the fluid 30 into the two cavities 43, 46, the flow guide element 40 forms a plurality of flow channels 50, through which the fluid 30 can flow along the arrows shown in FIG. 1.

The embodiment of the flow guide element 40 shown in FIGS. 1-2 further comprises at least one rib 52, which provides a flow bifurcation 51 through an opening 53 arranged therein or thereon, in order to supply, at this flow bifurcation 51, a first partial quantity 54 to the first fluid reservoir 44 and a second partial quantity 55 to the second fluid reservoir.

Division into a first partial quantity 54 and a second partial quantity 55 of the fluid 30 takes place simply under the effect of gravity when the flow velocity of the fluid 30 is below a limit velocity by the first partial quantity 54 passing through the opening 53 into the first cavity 43, and a second partial quantity 55 being supplied further along the rib 52 into the second cavity 46.

If the flowing fluid 30 has a velocity above the limit velocity, it splashes or flows onto a baffle element 56, which is arranged downstream of the opening 53. This baffle element 56 causes the volumetric flow of fluid entering through the flow inlet 41 to be slowed down and thus there is still the possibility of a first partial quantity 54 passing through the opening 53 into the first cavity 43, and a second partial quantity 55 along the rib 52 reaching the second cavity 46.

Between the two cavities 43, 46 there is also an overflow device 57, which enables fluid 30 to flow from the second cavity 46 into the first cavity 43 under the effect of gravity when a limit fill level in the second cavity 46 is exceeded.

The two cavities 43, 46 are each fluidically coupled to a lubrication device 60, which is merely indicated in FIGS. 1 and 2.

Figures 3, 4:
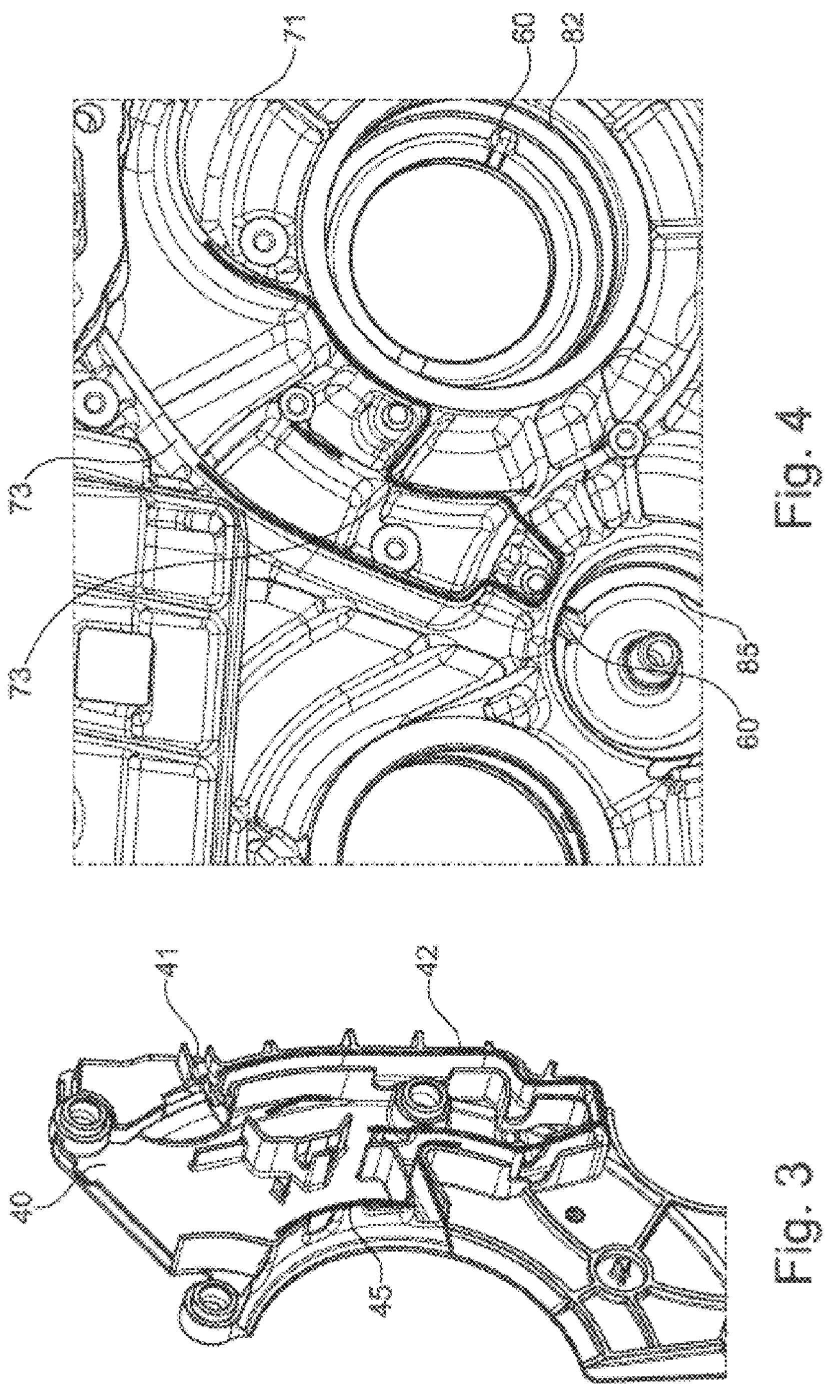
FIG. 3: shows a perspective view of the flow guide element.
FIG. 4: shows a portion of a transmission housing.

FIG. 3 once again shows a perspective view of the flow guide element 40, wherein the cavity boundaries 42, 45 are clearly visible here, which boundaries simultaneously serve to rest and seal against an axially opposite transmission housing 71, regions of which are shown in FIG. 4. In both FIGS. 3 and 4, the respective contact contour is visually highlighted.

As is also apparent from FIG. 4, the lubrication devices 60 merely indicated in FIG. 2 also have outlet openings which are provided at bearing points, namely in a differential gear shaft bearing 82 and also in an intermediate gear shaft bearing 85.

Accordingly, the flow guide element 40 makes it possible to supply lubricant or fluid 30 to these bearing points 85 in a simple and space-saving manner.

There is no need to accept any loss of strength in the transmission housing 71 because the flow guide element 40 is complementarily adapted in terms of shape and size to raised structures 73, such as ribs 52 which are provided to increase strength, on the outside 72 of the transmission housing 71. Such raised structures 73 are also indicated in FIG. 2.

Figure 5:
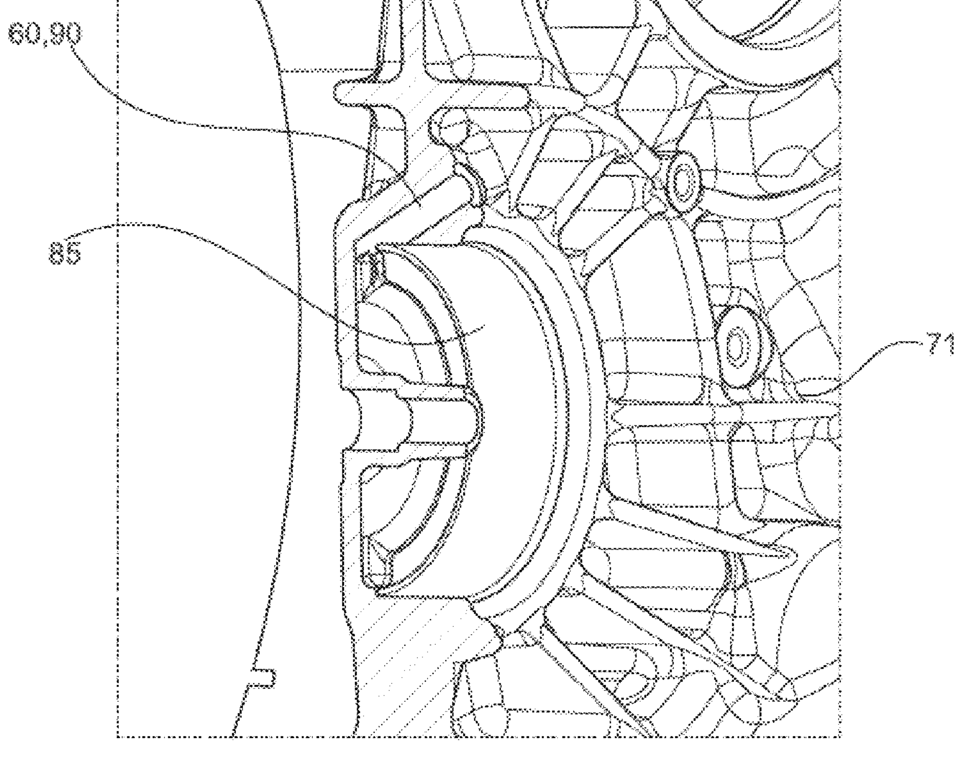
FIG. 5: shows a perspective view of another portion of a transmission housing.

FIG. 5 shows a component of the lubrication device 60 in the form of a channel 90, which is provided on the intermediate gear shaft bearing 85. It is apparent here that lubricant can be supplied through the channel 90 directly to the bearing or to the intermediate gear shaft itself.

Figure 6:
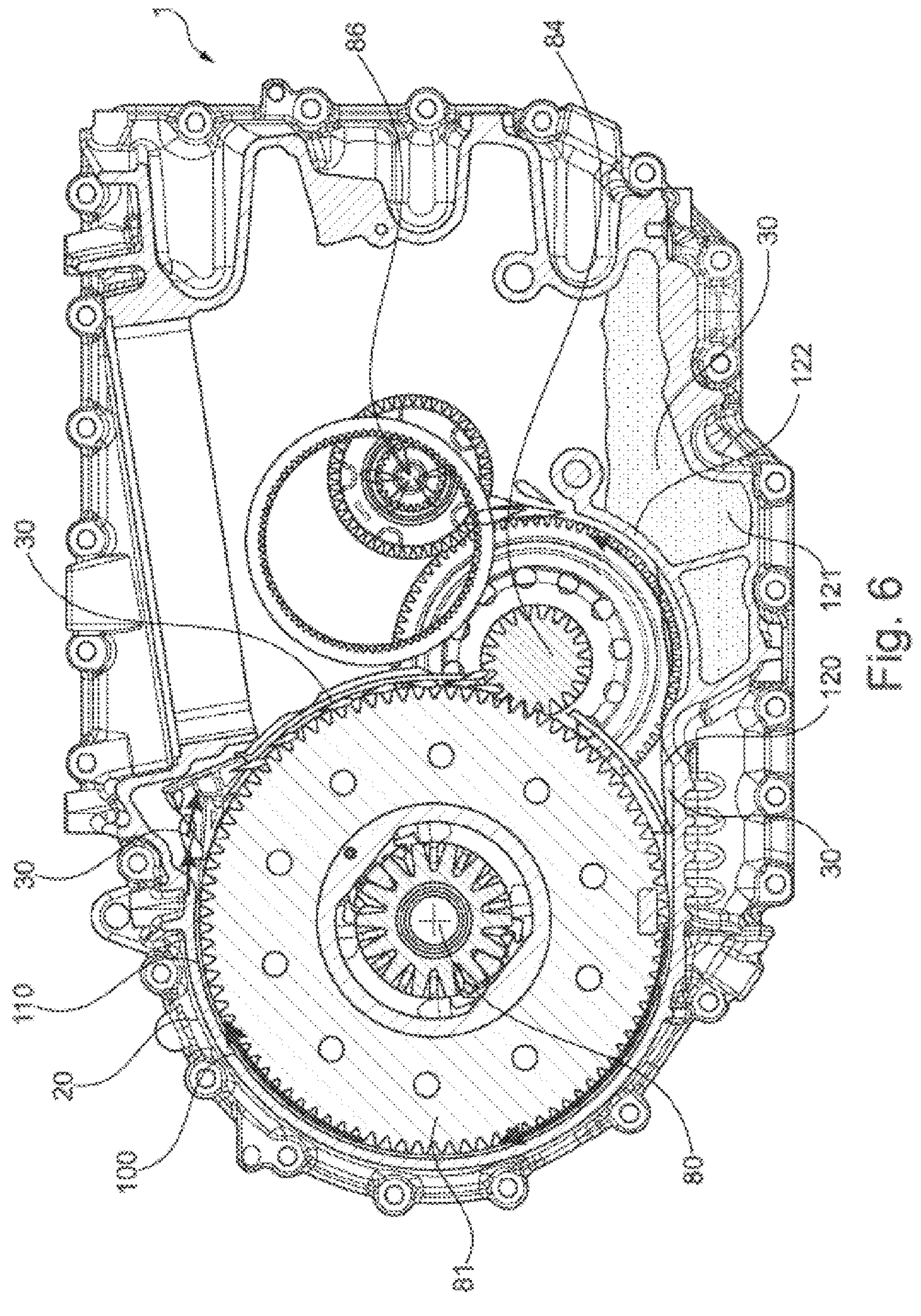
FIG. 6: shows an axial view of a drive unit.

In order to clarify the overall context, FIG. 6 shows an axial view the drive unit 1 without the flow guide element. The drive unit 1 comprises a drive housing 20, from which an electric machine shaft 86 leads axially. Positioned axially outside the drive housing 20 are an intermediate gear shaft 83 with an intermediate gear 84 arranged thereon, and a differential gear shaft 80 with a differential gear 81 arranged thereon.

The differential gear 81 is surrounded on its outside by a cover element 100, which provides a very small gap 110 between itself and the differential gear 81. The differential gear 81 projects with its lowest region into a first sub-compartment 120 of an oil reservoir. Next to the first sub-compartment 120 there is a second sub-compartment 121, which is separated from the first sub-compartment 120 by a partition 122. There is a fluidic connection between the two sub-compartments 120, 121, which enables fluid 30 to flow from the second sub-compartment 121 into the first sub-compartment 120.

This ensures that a certain amount of fluid 30 is always contained in the first sub-compartment. When the differential gear 81 rotates along the direction of rotation shown, the differential gear 81, like an impeller pump, delivers fluid 30 from the first sub-compartment through the gap 110 between the differential gear 81 and the cover element 100. By adjusting the fluidic connection between the two sub-compartments 120, 121, it is possible to ensure that there is not too much fluid 30 in the first sub-compartment 120 and that, as a result, only small drag losses occur.

Figure 7:
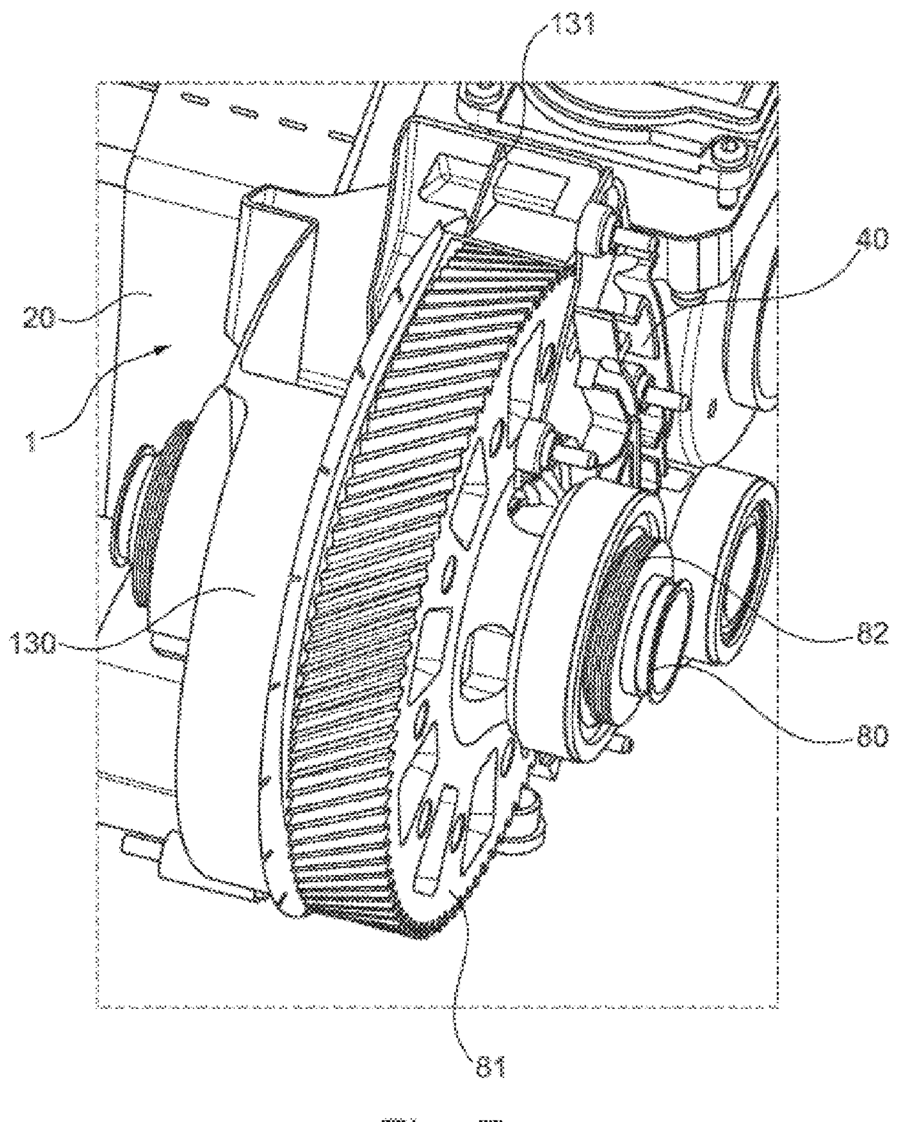
FIG. 7: shows a perspective view of an axial end region of the drive unit.
Figure 8:
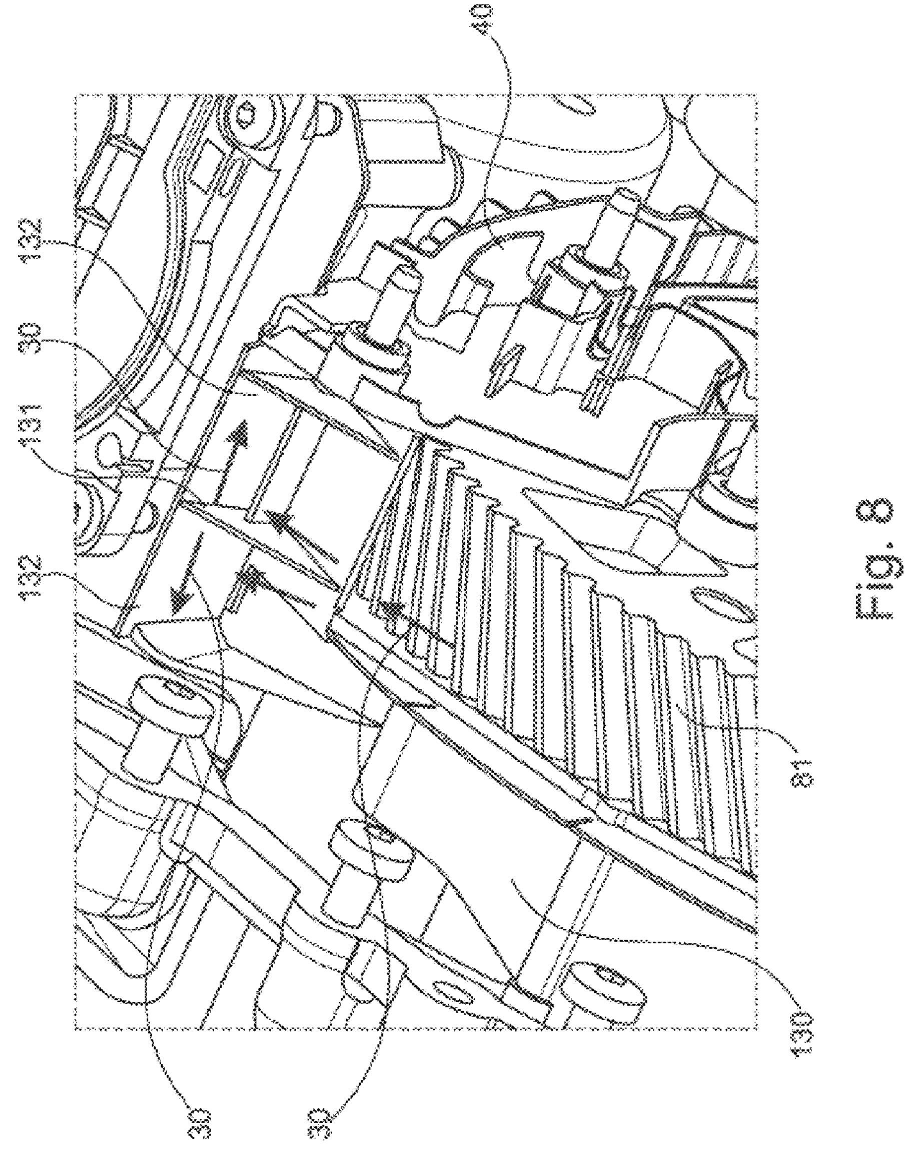
FIG. 8: shows an enlarged perspective view of the axial end region of the drive unit.

In the upper region of the differential gear 81, the fluid 30 delivered by the differential gear 81 is supplied to a flow divider 130, which is shown in FIGS. 7 and 8.

The flow divider 130 comprises a separating element 131, which substantially axially halves the volumetric flow of fluid delivered by the differential gear 81, such that fluid 30 is divided and directed away axially on both sides of the differential gear 81 along the guide elements 132 shown in FIG. 8. The partial volumetric flow of the fluid 30, which is diverted to the right according to FIG. 8, then reaches the flow inlet 41 of the flow guide element 40 as described in FIG. 1. The partial volumetric flow diverted to the left can be supplied to another bearing point, and optionally also to the differential gear shaft.

Figure 9:
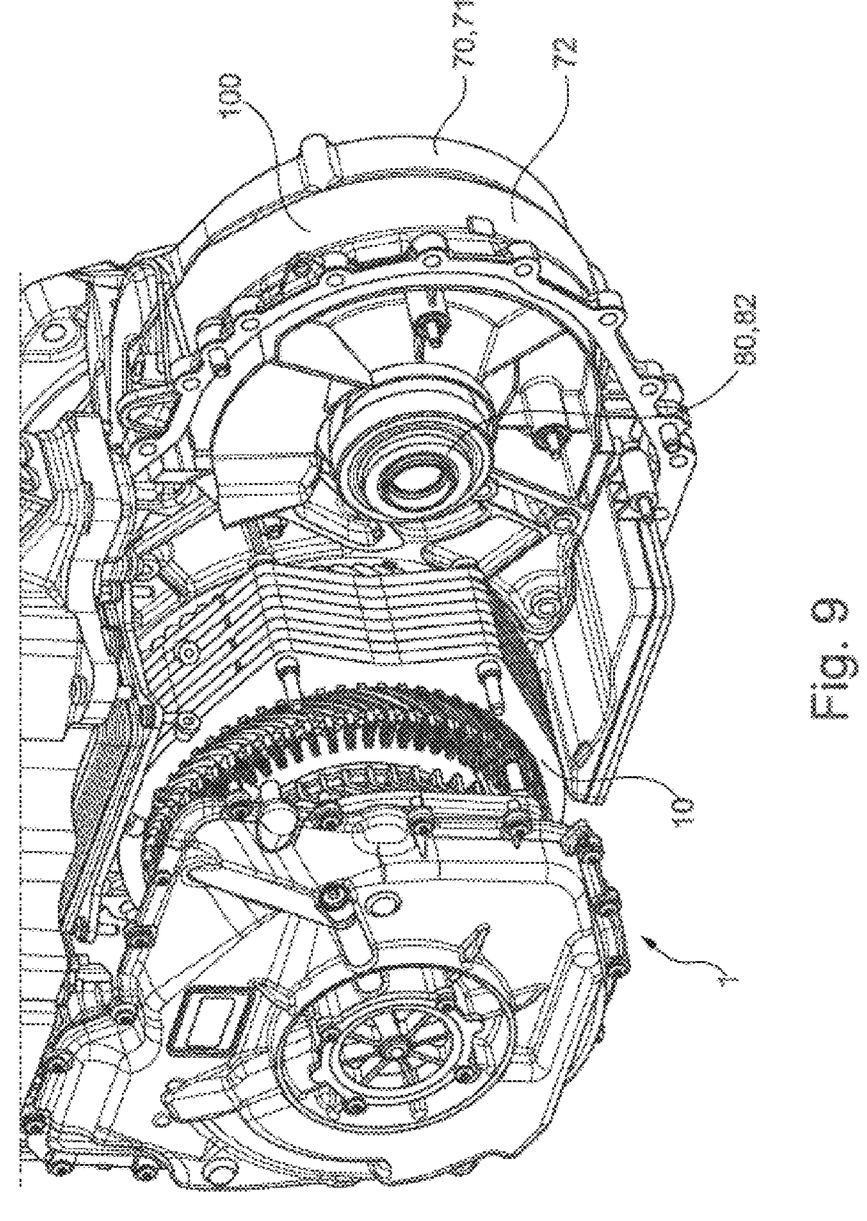
FIG. 9: shows a perspective view of the drive transmission.

However, FIG. 9 shows a drive transmission in which the drive housing has been omitted. An electric machine 10 is clearly visible here. Furthermore, the differential gear shaft 80 can be seen, as well as the differential gear shaft bearing 82 and the flow divider 130. In addition, the transmission 70 and the transmission housing 71 can also be seen in this view, wherein it is apparent that the cover element 100 forms the transmission housing 71 in the region where it overlies the differential gear, which is hidden here.

The drive system and the drive transmission comprising the drive system proposed herein provide devices which can be used to lubricate connected or integrated transmission elements in a simple, cost-effective and space-saving manner.

LIST OF REFERENCE SIGNS

1 Drive unit
10 Electric machine
20 Drive housing
30 Fluid
40 Flow guide element
41 Flow inlet
42 First cavity boundary
43 First cavity
44 First fluid reservoir
45 Second cavity boundary
46 Second cavity
47 Second fluid reservoir
50 Flow channel
51 Flow bifurcation
52 Rib
53 Opening
54 First partial quantity
55 Second partial quantity
56 Baffle element
57 Overflow device
60 Lubrication device
70 Transmission
71 Transmission housing
72 Outside of the transmission housing
73 Raised structure
80 Differential gear shaft
81 Differential gear
82 Differential gear shaft bearing
83 Intermediate gear shaft
84 Intermediate gear
85 Intermediate gear shaft bearing
86 Electric machine shaft
90 Channel
100 Cover element
110 Gap
120 First sub-compartment
121 Second sub-compartment
122 Partition
130 Flow divider
131 Separating element
132 Guide element

The invention claimed is:

1. A drive system comprising:
a drive unit comprising:
a drive housing; and
a flow guide element mechanically fixed on an outside of the drive housing, the flow guide element comprising:
a first cavity boundary forming at least regions of a first fluid reservoir, a first cavity is delimited at least in regions by the first cavity boundary and is fluidically connected to a lubrication device;
a second cavity boundary forming at least regions of a second fluid reservoir, a second cavity is delimited at least in regions by the second cavity boundary and is fluidically connected to the lubrication device, the flow guide element defining a flow channel supplying fluid into the first cavity and the second cavity, the second cavity comprising an overflow device, the fluid flowing from the second cavity into the first cavity by way of the overflow device when a limit fill level in the second cavity is exceeded; and a rib defining a flow bifurcation through an opening in the rib, the flow bifurcation formed in the flow channel for supplying fluid to the first cavity and to the second cavity.

2. The drive system according to claim 1, wherein the lubrication device is a channel on a gear shaft bearing.

3. The drive system according to claim 1, wherein the flow guide element comprises a flow inlet disposed above the first cavity and the second cavity, wherein the fluid passes from the flow inlet into the flow channel.

4. The drive system according to claim 3, wherein a division into a first partial quantity and a second partial quantity of the fluid occurs via a gravity feed when a flow velocity of the fluid is below a limit velocity by the first partial quantity passing through the opening into the first cavity and a second partial quantity being supplied further along the rib into the second cavity.

5. The drive system according to claim 4, wherein the rib has a baffle element for providing a baffle effect for a fluid impinging on the baffle element at and above the limit velocity, the baffle effect distributing the fluid through the flow bifurcation into the first cavity and into the second cavity.

6. The drive system according to claim 5, wherein the baffle element slows down the fluid entering through the flow inlet.

7. A drive transmission, comprising the drive system according to claim 1, wherein the drive transmission further comprises a transmission with a transmission housing, and at least one cavity, which is delimited at least in regions by a cavity boundary, is delimited axially on one side by the outside of the transmission housing, wherein the first cavity boundary and the second cavity boundary seals against the transmission housing.

8. The drive transmission according to claim 7, wherein the lubrication device is formed in or on a differential gear shaft bearing and/or an intermediate gear shaft bearing of the transmission connected to the drive unit.

9. The drive transmission according to claim 7, wherein the drive transmission comprises a differential transmission with a differential gear, wherein the differential gear delivers a volumetric flow of fluid to the flow guide element, wherein the flow guide element is axially offset from the differential gear, wherein the drive transmission comprises a flow divider axially diverting a partial volumetric flow of the fluid to a flow inlet of the flow guide element.

10. The drive transmission according to claim 7, wherein the transmission housing has a raised structure on its outside, wherein the flow guide element is complementary to a shape and size of a structure in a contact region on the outside of the transmission housing.

11. A drive unit comprising:

a drive housing; and a flow guide element mechanically fixed to an outside of the drive housing, the flow guide element comprising:

a first cavity boundary forming one or more regions of a first fluid reservoir, the first cavity boundary defines a first cavity, the first cavity is fluidically connectable to a lubrication device;

a second cavity boundary forming one or more regions of a second fluid reservoir, the second cavity boundary defines a second cavity, the second cavity is fluidically connectable to the lubrication device, the flow guide element defining a flow channel supplying fluid into the first cavity and the second cavity, the second cavity comprising an overflow device, the fluid flowing from the second cavity into the first cavity by way of the overflow device when a limit fill level in the second cavity is exceeded; and a rib defining a flow bifurcation through an opening in the rib, the flow bifurcation formed in the flow channel for supplying fluid to the first cavity and to the second cavity.

12. The drive unit according to claim 11, wherein the lubrication device is a channel on a gear shaft bearing.

13. The drive unit according to claim 11, wherein the flow guide element comprises a flow inlet disposed above the first cavity and the second cavity, wherein the fluid passes from the flow inlet into the flow channel.

14. The drive unit according to claim 13, wherein a division into a first partial quantity and a second partial quantity of the fluid occurs via a gravity feed when a flow velocity of the fluid is below a limit velocity by the first partial quantity passing through the opening into the first cavity and a second partial quantity being supplied further along the rib into the second cavity.

15. The drive unit according to claim 14, wherein the rib comprises a baffle element for providing a baffle effect for a fluid impinging on the baffle element at or above the limit velocity, the baffle element distributing the fluid through the flow bifurcation into the first cavity and into the second cavity.

16. The drive unit according to claim 15, wherein the baffle element slows down the fluid entering through the flow inlet.

17. A drive system comprising:

a transmission comprising a transmission housing and at least one cavity defined in one or more regions by a cavity boundary; and a drive unit comprising:

a drive housing; and a flow guide element mechanically fixed to an outside of the drive housing, the flow guide element comprising:

a first cavity boundary forming one or more regions of a first fluid reservoir, the first cavity boundary defines a first cavity, the first cavity is fluidically connectable to a lubrication device;

a second cavity boundary forming one or more regions of a second fluid reservoir, the second cavity boundary defines a second cavity, the second cavity is fluidically connectable to the lubrication device, the flow guide element defining a flow channel supplying fluid into the first cavity and the second cavity, the second cavity comprising an overflow device, the fluid flowing from the second cavity into the first cavity by way of the overflow device when a limit fill level in the second cavity is exceeded; and a rib defining a flow bifurcation through an opening in the rib, the flow bifurcation formed in the flow channel for supplying fluid to the first cavity and to the second cavity.

18. The drive system according to claim 17, wherein the lubrication device is formed in or on a differential gear shaft bearing and/or an intermediate gear shaft bearing of the transmission connected to the drive unit.

19. The drive system according to claim 17, wherein the transmission comprises a differential transmission with a differential gear.

20. The drive system according to claim 17, wherein an exterior of the transmission housing includes a raised structure, wherein the flow guide element is complementary to the raised structure in a contact region on the exterior of the transmission housing.

* * * * *